United States Patent [19]

Shiba et al.

[11] Patent Number: 4,991,680
[45] Date of Patent: Feb. 12, 1991

[54] CONTROL DEVICE OF A REMOTE FREE WHEEL HUB MECHANISM

[75] Inventors: Masayoshi Shiba, Anjo; Tooru Kagata, Toyota, both of Japan

[73] Assignee: Aisin Seiki Kabushiki Kaisha, Japan

[21] Appl. No.: 251,528

[22] Filed: Sep. 30, 1988

[30] Foreign Application Priority Data

Sep. 30, 1987 [JP] Japan ................................... 62-24674

[51] Int. Cl.$^5$ ...................... B60K 23/00; F16D 27/16; F16D 41/00
[52] U.S. Cl. ..................................... 180/233; 180/247; 192/40; 192/50
[58] Field of Search ........................ 180/233, 197, 247; 192/50, 40, 35; 340/52 R

[56] References Cited

U.S. PATENT DOCUMENTS 4,694,943  9/1987  Petrak ................................ 192/40 X

FOREIGN PATENT DOCUMENTS

| 64035 | 4/1985 | Japan | 180/233 |
| 46717 | 2/1987 | Japan | 180/233 |
| 218235 | 9/1987 | Japan | 180/233 |
| 231820 | 10/1987 | Japan | 180/233 |
| 279131 | 12/1987 | Japan | 180/233 |

Primary Examiner—Mitchell J. Hill
Attorney, Agent, or Firm—Burns, Doane, Swecker & Mathis

[57] ABSTRACT

A control device of a remote free wheel hub mechanism includes a free wheel hub mechanism, an actuator and a control circuit. The control circuit further includes a two-wheel-drive circuit, a four-wheel-drive circuit, a transfer shift position detecting sensor, and an engine rotation drive detecting sensor. One of the two-wheel-drive circuit and the four-wheel-drive circuit in the transfer shift position detecting sensor moves to a closed condition independently of the shift position when the engine is stopped, and the transfer shift position detecting sensor correspondingly produces a signal of one of the two-wheel-drive and four-wheel-drive conditions, respectively. The engine rotation drive detecting sensor detects a rotational condition of an engine and produces a signal which closes one of the two-wheel-drive and the four-wheel-drive circuits when the engine is stopped.

3 Claims, 4 Drawing Sheets

CONTROL DEVICE OF A REMOTE FREE WHEEL HUB MECHANISM

BACKGROUND OF THE INVENTION

1. Field of the Invention

The invention relates to a control device of a remote free wheel hub mechanism which is positioned between an axial shaft and a wheel hub for a four-wheel drive car. The control device controls the lock or engaged and free or disengaged conditions of the free wheel hub by a remote control.

2. Description of Prior Art

A conventional remote free wheel hub mechanism is shown in a Japanese patent laid-open publication No. 60-12336 (1985).

In a conventional mechanism the engaging of the hub clutch is controlled by electric magnets.

In other conventional mechanisms, the engaging of the hub clutch is controlled by a hydraulic or negative pressure, and the control is electrically operated.

In the conventional control devices, after the engine is stopped at a low temperature, an inside resistor of the free wheel hub and the power train is increased. Next, when the engine is started, the change of the free wheel hub from a two-wheel-drive position to a four-wheel-drive position is not available. Therefore, an idle driving is required upon engine start for preventing non-operation of the four-wheel-drive.

SUMMARY OF THE INVENTION

An object of the present invention is to provide a control device of a remote free wheel hub mechanism in which the change of the free wheel hub from a two-wheel-drive position to a four-wheel-drive position is easily performed with certainty upon engine start at a low level temperature.

A further object of the present invention is to provide a control device of the remote free wheel hub mechanism in which the warming-up of the engine is not required.

In order to accomplish these objects, a control device of a remote free wheel hub mechanism comprises a free wheel hub mechanism, an actuator and a control circuit. The control circuit further includes a two-wheel-drive circuit, a four-wheel-drive circuit, a transfer shift position detecting sensor, and an engine rotation drive detecting sensor. One of the two wheel-drive circuit and the four-wheel drive circuit in the transfer shift position detecting sensor moves to a closed condition independently of the shift position when the engine is stopped, and the transfer shift position detecting sensor produces a signal corresponding to the two-wheel-drive or the four-wheel-drive condition, respectively. The engine rotation drive detecting sensor detects a rotational condition of an engine and produces a signal which effects a closed condition of one of the two-wheel-drive and the four-wheel-drive circuits when the engine is stopped.

BRIEF DESCRIPTION OF THE DRAWINGS

The above and other objects, features and advantages of the present invention will become more apparent from the following description of a preferred embodiment thereof taken in conjunction with the accompanying drawings wherein.

DETAILED DESCRIPTION OF A PREFERRED EMBODIMENT OF THE INVENTION

Figure 1:
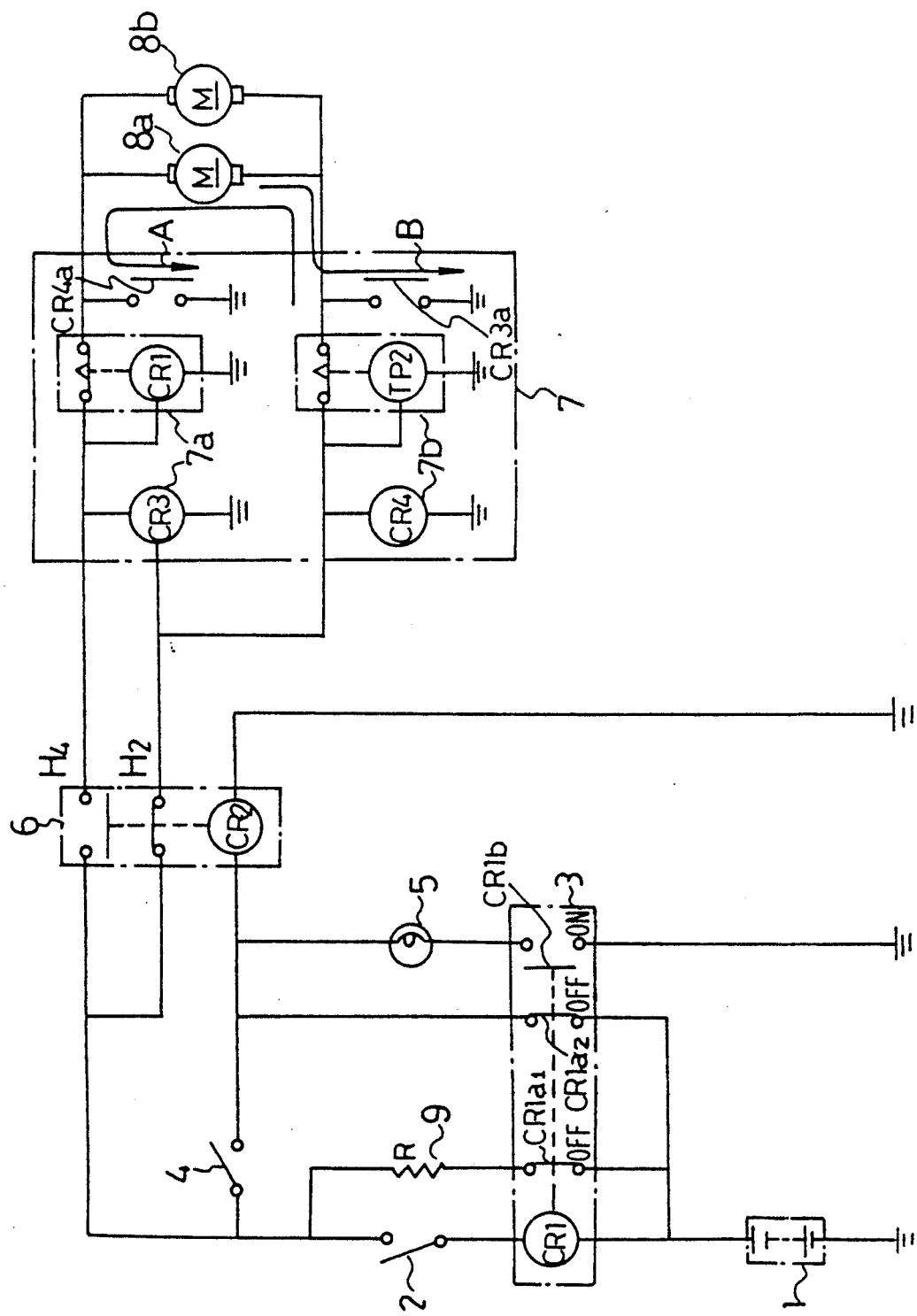
FIG. 1 shows an electric circuit of the control device of the remote free wheel hub mechanism of the invention.
Figure 2:
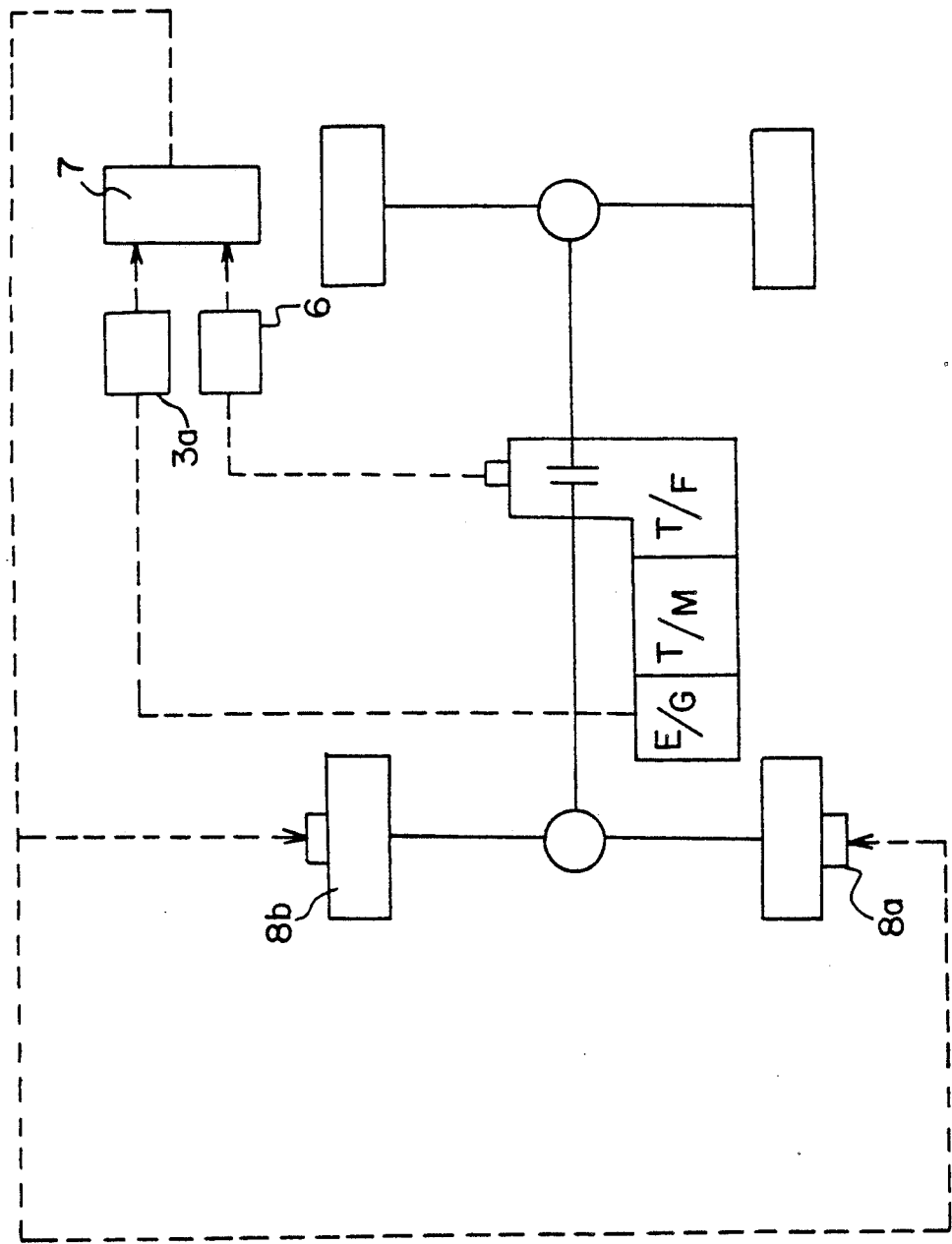
FIG. 2 is a schematic representation of a control for the remote free wheel hub mechanism.
Figure 3:
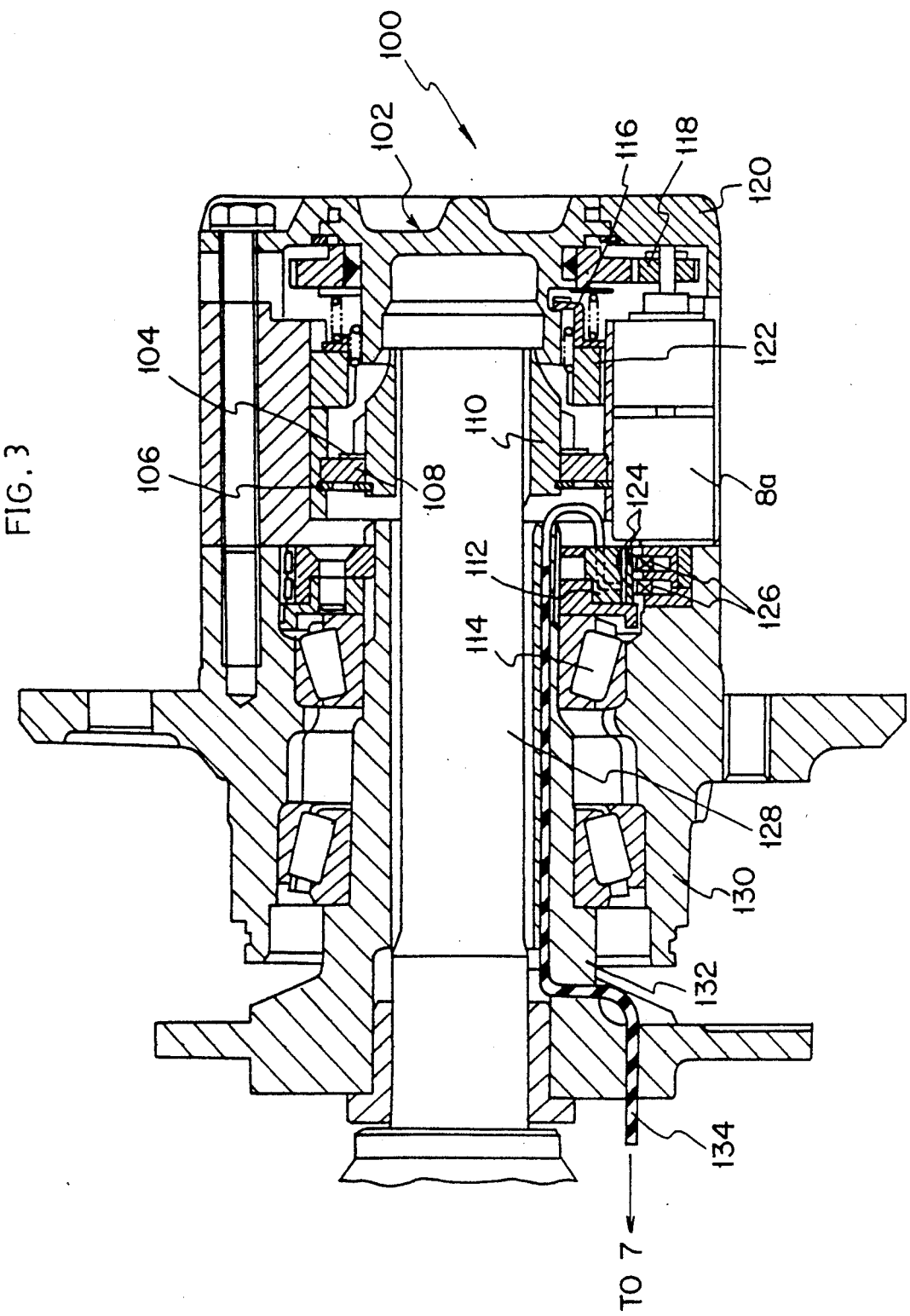
FIG. 3 is a side elevation view in cross-section, of the free wheel hub of the invention.
Figure 4:
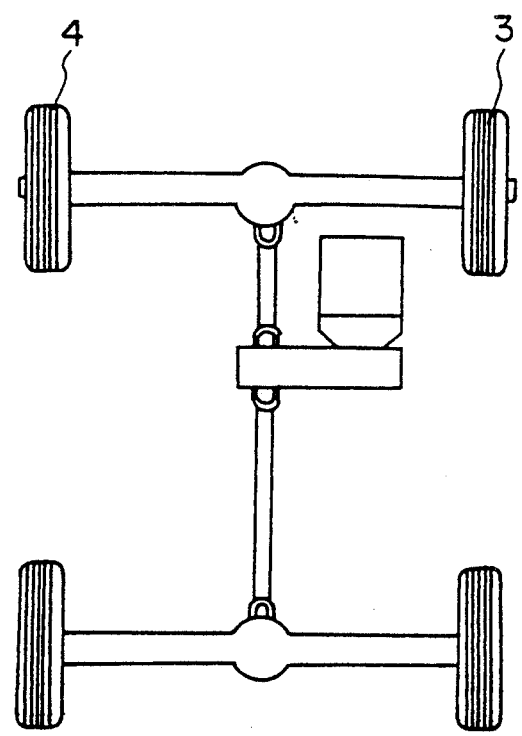
FIG. 4 is a schematic representation of a vehicle drive train incorporating the invention.

A pair of free wheel hubs for a pair (right and left) of wheels (FIG. 3 and 4) have electric rotational motors $8a$, $8b$ as actuators for the purpose of changing the wheel hubs between lock or engaged and free or disengaged conditions. The motors $8a$, $8b$ are connected in parallel, and are controlled by a free wheel hub driving circuit 7. The free wheel hub driving circuit 7 comprises a lock condition circuit $7a$ and a free condition circuit $7b$ which are connected in series. Time limiting contact points TR1, TR2 are settle connected in the lock condition circuit $7a$ and the free condition circuit $7b$, respectively, and they are operated to generate a current only when the free wheel hub is operated to a lock condition. A relay CR3 is connected in parallel with the time limiting contact point TR1 in the lock condition circuit $7a$. A relay CR4 is connected in parallel with the time limiting contact point TR2 in the free condition circuit $7b$. The relay CR3 drives a normally opened contact CR3a located between the time limiting contact TR2 and the motors $8a$, $8b$ in the free condition circuit $7b$. The normally opened contact point CR3a is connected in parallel to the time limiting contact point TR2. The relay CR4 drives a normally opened contact point CR4a located between the time limiting contact point TR1 and the motors $8a$, $8b$ in the lock condition circuit $7a$. The normally opened contact point CR4a is connected in parallel with the time limiting contact point TR1. The input side of the lock condition circuit $7a$ is connected with the output side of the normally opened contact point H4 of a transfer shift position detecting sensor 6 which comprises a relay CR2. The input side of the free condition circuit $7b$ is connected with the output side of the normally closed contact point H2 of the shift position detecting sensor 6. The normally closed contact point H2 and the normally opened contact point H4 of the transfer shift position detecting sensor 6 are mechanically connected, and are operated by a coil part of the relay CR2. The inputs of the normally closed contact point H2 and the normally opened contact point H4 are connected with an output side of an engine rotation drive detecting sensor 3. The input side of the coil part of the relay CR2 is connected with the output of the engine rotation drive detecting sensor 3. The engine rotation drive detecting sensor 3 comprises a relay CR1, and the relay CR1 has normally closed contact points CR1a1, CR1a2 and a normally opened contact point CR1b. The contact points CR1a1, CR1a2, CR1b are mechanically connected. A coil part of the relay CR1 and the input sides of the normally closed contact points CR1a1, CR1a2 are connected with a battery 1. Between the output side of the coil part of the relay CR1, and the input sides of the normally closed contact point H2 and the normally opened contact point H4, an ignition switch 2 is connected. Between the output side of the normally closed contact point CR1a1, and the input sides of the normally closed contact point H2 and the normally opened contact point H4, a resistor 9 is connected. The resistive value of the resistor 9 is the same as the resistive value of the coil part of the relay CR1. The output side of the normally closed contact point CR1a2 is directly connected with the output side of the coil part of the relay CR2. Between the output side of the normally opened contact point CR1b and the input side of the coil part of the relay CR2, an indicating lamp 5 for four-wheel-drive is connected. Between the output side of the ignition switch 2 and the input side of the coil part of the relay CR2 of the transfer shift position detecting sensor 6, an indicating switch 4 for four-wheel-drive is connected. The indicating switch 4 is in an ON state when the drive transfer shift device is positioned at the four-wheel-drive side, and is in an OFF state when the transfer shift is positioned at the two-wheel-drive side.

In the above mentioned embodiment, the control device of the remote free wheel hub mechanism of the present invention operates as follows.

When the engine is driven and the drive transfer shift device is shifted from the four-wheel-drive to the two-wheel-drive, the ignition switch 2 is closed. A voltage is then applied to the coil part of the relay CR1 of the engine rotation drive detecting sensor 3 and the engine rotation drive detecting sensor 3 is placed into an ON condition. In this condition, the normally closed contact points CR1a1 and CR1a2 are opened and the normally opened contact point CR1b is closed. Therefore, the circuit which connects the battery 1 to the input side of the normally opened contact point H4 and the normally closed contact point H2 of the transfer shift position detecting sensor 6 through the coil part of the relay CR1 and the ignition switch 2 is closed. In addition, the circuit which connects the battery 1 to the input side of the normally closed contact point H2 and the normally opened contact point H4 of the transfer shift position detecting sensor 6 through the normally closed contact point CR1a1 and the resistor 9 is opened, as is the circuit which connects the battery 1 to the input side of the coil part of the relay CR2 of the transfer shift position detecting sensor 6 through the normally closed contact point Cr1a2. The circuit which connects the output side of the ignition switch 2 to the input side of the coil part of the relay CR2 through the four wheel drive indicator switch 4 is opened. Because the four-wheel-drive indicator switch 4 is opened, the normally opened contact point H4 in the transfer shift position detecting sensor 6, is opened and the normally closed contact point H2 is closed. Therefore, the current of the battery 1 is supplied to the coil parts of the relay CR4 and the time limiting contact point TR2 of the free condition circuit 7b in the free wheel hub driving circuit 7. Thus, the normally opened contact point CR4a of the relay CR4 is closed. Consequently, the current shown by the arrow A flows at a certain time (the time which is determined by the time limiting contact point TR2) from the battery 1 to the motors 8a, 8b, and the free wheel hub is shifted to the two-wheel-drive position by the motors 8a, 8b.

When the engine is driven and the drive transfer shift device is shifted from the two-wheel-drive to the four-wheel-drive, operation is as follows. As in the case where the transfer shift is shifted from the four-wheel-drive to the two-wheel-drive, the circuit which connects the battery 1 to the input sides of the normally opened contact point H4 and the normally closed contact point H2, of the transfer shift position detecting sensor 6, through the coil part of the relay CR1 and the ignition switch 2, is closed. When the drive transfer shift device is to be shifted from the two-wheel-drive to the four-wheel-drive position, the four wheel drive indicator switch 4 is closed and the current is supplied to the coil part of the relay CR2 of the transfer shift position detecting sensor 6. Therefore, the normally opened contact point H4 of the transfer shift position detecting sensor 6 is closed and the normally closed contact point H2 is opened. At this time, the four-wheel-drive indicator switch 4 is closed, so that the current is supplied to the four-wheel-drive indicating lamp 5 and the four-wheel-drive indicating lamp 5 is switched on. The current which flows through the normally opened contact point H4 of the transfer shift position detecting sensor 6 is supplied to the coil parts of the relay CR3 and the time limiting contact point TR1 of the lock condition circuit 7a in the free wheel hub driving circuit 7 to close the normally opened contact point CR3a of the relay CR3. Consequently, the current shown by the arrow B flows at a certain time (the time which is determined by the time limiting contact point TR2) from the battery 1 to the motors 8a, 8b and the free wheel hub is shifted to the four-wheel-drive position by the motors 8a, 8b.

The operation of the control device of the remote wheel hub directly after the engine is stopped is described as follows:

The ignition switch 2 is opened, so that no current is supplied to the relay CR1 of the engine rotation drive detecting sensor 3, such that the normally closed contact points CR1a1, CR1a2 are closed and the normally opened contact point CR1b is opened. Since the current is supplied to the coil part of the relay CR2 of transfer shift position detecting sensor 6 through the circuit which is connected to the normally closed contact point CR1a2 of the engine rotation drive detecting sensor 3 regardless of whether the four-wheel-drive indicator switch 4 is ON or OFF, the normally opened contact point H4 is closed and the normally closed contact point H2 is opened. Consequently, the current which flows from the battery 1 to the normally opened contact point H4 through the normally closed contact point CR1a1 and the resistor 9 is closed, and the current is supplied to the free wheel hub driving circuit. Therefore, the lock condition circuit 7a is operated and the free wheel hub is shifted to the four-wheel-drive position. At this time, the normally opened contact point CR1b is opened such that the four-wheel-drive indicating lamp 5 is not switched on. As mentioned above, when the engine stops, the free wheel hub becomes placed in the lock condition.

In the above mentioned example, the electric motor is used as the actuator of the free wheel hub, however, other electric actuators, hydraulic actuators or pneumatic (especially vacuum) actuators are able to be substituted for the electric motor.

In order to comply with the specifications of a vehicle, it is possible to design the control device, so that the free wheel hub is absolutely shifted to the two-wheel-drive position when the engine stops.

This control device is adapted to a vehicle which has a free wheel hub clutch in the power train of the non-drive two wheel side to control the two-wheel-drive condition.

According to the invention, the free wheel hub is moved to the lock position or the free position when the engine stops in a condition of higher engine temperature, while either the two-or four-wheel-drive condition is held without warming-up of the engine when the engine starts at a low temperature.

Although the present invention has been described through specific terms, it should be noted here that the described embodiment is not necessarily exclusive and various changes and modifications may be imparted thereto without departing from the scope of the invention which is limited solely by the appended claims, and all changes that come within the meaning and range of equivalents thereof are intended to be embraced therein.

We claim:

1. A control device of a remote free wheel hub mechanism, comprising:
   a free wheel hub mechanism disposed between an axle shaft and a wheel;
   an actuator operatively connected to said free wheel hub mechanism;
   a control circuit for controlling said actuator to a two-wheel-drive condition or a four-wheel-drive condition with a signal and further comprising a two-wheel-drive circuit, a four-wheel-drive circuit, a transfer shift position detecting sensor and an engine driving detecting sensor for detecting engine rotation;
   said engine rotation drive detecting sensor detecting a rotational condition of an engine and generating a signal which is transmitted to one of said two-wheel-drive circuit and said four-wheel-drive circuit so as to close and establish the four-wheel-drive condition when said engine stops operation;
   said transfer shaft position detecting sensor moving one of said two-wheel-drive circuit and said four-wheel drive circuit to a closed condition independently of a shift position when said engine stops operation and correspondingly producing a signal indicative of either said two-wheel-drive or said four-wheel-drive condition.

2. A control device of a remote free wheel hub mechanism according to claim 1, wherein
   said engine rotation drive detecting sensor generates a signal for closing said four-wheel-drive circuit of said transfer shift position detecting sensor when said engine stops.

3. A control device of a remote free wheel hub mechanism according to claim 1, wherein said actuator comprises an electric motor.

* * * * *